United States Patent [19]
Furukawa et al.

[11] 3,879,345
[45] Apr. 22, 1975

[54] SELF-EXTINGUISHING POLYSTYRENE RESIN COMPOSITION

[75] Inventors: Shogi Furukawa; Yuzo Sonoyama; Akira Ohi, all of Sakai, Japan

[73] Assignee: Daicel Ltd., Osaka, Japan

[22] Filed: Sept. 6, 1973

[21] Appl. No.: 394,690

[30] Foreign Application Priority Data
Sept. 18, 1972 Japan.............................. 47-93458

[52] U.S. Cl... 260/45.95 R; 260/2.5 FP; 260/45.7 P
[51] Int. Cl.............................................. C09k 3/28
[58] Field of Search...... 260/2.5 FP, 45.7 R, 45.7 P, 260/45.95 R

[56] References Cited
UNITED STATES PATENTS

| 2,617,737 | 11/1952 | Stern.................................. | 106/177 |
| 3,324,076 | 6/1967 | Elder et al. ........................ | 260/45.8 |
| 3,639,304 | 2/1972 | Raley, Jr.............................. | 260/2.5 |
| 3,639,506 | 2/1972 | Haaf................................... | 260/874 |
| 3,715,310 | 2/1973 | Butcher.............................. | 252/8.1 |

FOREIGN PATENTS OR APPLICATIONS
902,903   8/1962   United Kingdom

OTHER PUBLICATIONS
Hilado, "Flammability Handbook for Plastics," 1969, pages 85 and 86.

*Primary Examiner*—Donald E. Czaja
*Assistant Examiner*—R. A. White
*Attorney, Agent, or Firm*—Woodhams, Blanchard and Flynn

[57] ABSTRACT

A self-extinguishing polystyrene resin composition characterized by containing a mixture of (a) tricresyl phosphate and/or triphenyl phosphate and (b) tetrabromobisphenol A in a molar ratio of 8:2 – 1:9 in such an amount that equimolar mixture of components (a) and (b) is contained in an amount of at least 2% by weight in the polystyrene resin composition.

5 Claims, 2 Drawing Figures ively in view of the
SELF-EXTINGUISHING POLYSTYRENE RESIN COMPOSITION

BACKGROUND OF THE INVENTION

1. FIELD OF THE INVENTION

The present invention relates to polystyrene resin compositions having excellent self-extinguishing properties.

The term "self-extinguishing property" employed herein means that, if an external flame source is applied to the polystyrene resin composition to ignite same and then said external flame source is removed, the polystyrene resin composition itself will not maintain the flame and, therefore, burning of the composition stops, i.e., the composition does not support combustion.

2. DESCRIPTION OF THE PRIOR ART

Polystyrene resin compositions are used in large amounts for various purposes because of their excellent properties. However, they are not suitable materials for some purposes due to their flammability. For example, they are unsuitable for parts of electric appliances or office equipment, the burning of which will cause very dangerous situations. If the compositions are used in the form of foamed molded products, this disadvantage of easy flammability is especially serious. Accordingly, the use of such compositions as construction materials is limited greatly in spite of their excellent heat insulating property and sound absorbing property.

There have been proposed various processes for eliminating said disadvantage and imparting a flame-retardant property to polystyrene resins. Processes generally known to be effective for this purpose comprise adding to the polystyrene resin one or more of various additives such as some compounds containing halogens, some compounds containing phosphorous and antimony trioxide. Various ways of incorporating these additives in the resin are known. For example, the additives can be mechanically mixed or blended with polystyrene resin or they can be mixed with a styrene monomer or a mixture of styrene monomers, prior to polymerization thereof and then the resulting mixture is polymerized. Further, there has been proposed a process wherein a monomer containing halogen or phosphorus is synthesized and this monomer is copolymerized with the main component, i.e. styrene monomer, thereby to obtain flame-retardant polystyrene resin composition directly by the copolymerization.

However, the above described processes all have various disadvantages, such as the impact resistance or softening point of the resin composition is lowered, the allowable temperature range during extrusion molding is narrowed greatly whereby an error in the temperature control causes decomposition of the resin composition whereby to form improperly colored pellets or molded products, and the flame retardant property becomes unsatisfactory due to decomposition of the additive. If a sufficient flame retardant effect cannot be obtained unless a large amount of additive is used, the price of the final product becomes very high and/or the desired mechanical properties of the product are unfavorably affected. In view of these circumstances, investigations have been made for the purpose of finding an excellent flame-retarding process and a flame-retarding agent free of these disadvantages.

However, even if the halogen or phosphorus content of the halogen- or phosphorus-containing flame-retarding agent is high, it does not necessarily follow that the flame-retarding effect is great. Moreover, even if the halogen or phosphorus content of the final resin composition is high, the flame-retarding effect is not always great. In addition, the flame-retarding effect varies depending upon the molecular structure of the compound, even though the types and numbers of the atoms constituting the compound are the same. Thus, it is difficult to estimate prior to actual tests the flame-retarding effect of particular compounds or processes. As described above, the flame-retardant property is imparted by the sum of a variety of complicated factors. Therefore, it cannot be predicted what flame-retarding effect can be obtained by using a combination of several flame-retarding agents or a combination of the flame-retarding agents with other additives.

SUMMARY OF THE INVENTION

We have discovered, unexpectedly in view of the prior art, that a mixture, preferably an equimolar mixture, of (1) tricresyl phosphate (hereinafter referred to as TCP) and/or triphenyl phosphate (hereinafter referred to as TPP) and (2) tetrabromobisphenol A (hereinafter referred to as TBA) has an unexpectedly excellent flame-retarding effect when incorporated in polystyrene resin compositions.

If TCP, TPP or TBA is used alone for imparting a self-extinguishing property to polystyrene resin, the general physical properties of the resin are damaged seriously and molded products made therefrom are practically of no use, because a self-extinguishing property cannot be obtained by adding a few weight percent of TCP or TPP or TBA; rather it is necessary to add more than about 10 weight percent of each of them, when used alone, to obtain a self-extinguishing property. On the other hand, according to the present invention, the flammability of polystyrene resin can be reduced remarkably by incorporating therein as little as 2% by weight of an equimolar mixture of (1) one or both of TCP and TPP and (2) TBA. By incorporating about 5% by weight of such equimolar mixture, a self-extinguishing property can be obtained in nearly all cases. For obtaining a higher self-extinguishing property, the amount is increase. A product satisfying Underwriter's Laboratory (UL) Standard; SE-II can be obtained by incorporating in the polystyrene resin about 10% by weight of said equimolar mixture.

The reasons why the complex flame-retarding agent comprising (1) TCP and/or TPP and (2) TBA, exhibits an unexpected synergistic flame-retarding effect on polystyrene resin compositions are still unknown at present. As possible factors leading to this unexpected effect, there can be mentioned the effect of the coexistence of phosphorus and bromine in the agent, the compatibility in terms of chemical structure of the agent with polystyrene resin and the maintenance of the mechanical and thermal properties of the resin by the aromatic rings contained in the components of the complex flame-retarding agent.

Tricresyl phosphate (TCP) used in this invention is a colorless, odorless liquid having a boiling point of 275° – 280°C/20 mmHg, a structural formula of $(CH_3C_6H_4O)_3PO$ and a molecular weight 368.36. TCP is synthesized from cresol and phosphorus oxychloride in a known manner.

Triphenyl phosphate (TPP) used in this invention is white crystalline flakes having a melting point of 49° – 50°C, a structural formula of $(C_6H_5O)_3PO$ and a molecular weight 326.28. TPP is synthesized from phenol and phosphorus oxychloride in a known manner.

Tetrabromobisphenol A (TBA) used in this invention, together with tricresyl phosphate and/or triphenyl phosphate, is a white powder having melting point of 178° – 180°C, a structural formula of $HO \cdot C_6H_2Br_2 \cdot C(CH_3)_3 \cdot C_6H_2Br_2 \cdot OH$ and a molecular weight 543.7. TBA is synthesized by bromination of bisphenol A in a known manner.

The former compounds, i.e. TCP and TPP, are used generally as internal plasticizers and lubricants of plastics. The latter TBA is also used as a flame-retarding agent as suggested in, for example Japanese Patent Publication No. 29137/1971. We have found that, as compared with other flame-retarding agents comprising brominated compounds, YBA damages the physical properties of the resin to a far smaller degree, even though TBA exhibits a nearly equivalent effect of imparting flame-retardant property to polystyrene resin compositions.

The polystyrene resins useable in the present invention include homopolymers of styrene and styrene derivatives and copolymers thereof with other copolymerizable monomers, said copolymers containing at least about 40 wt. % of styrene or styrene derivative. For example, there can be employed polymers of styrene per se and styrene derivatives such as α-substituted styrene, for example, α-methylstyrene, vinyltoluene and o-chlorostyrene; inter-polymers of those monomers as predominant component and one or more copolymerizable monomers such as vinyl compounds, for example, acrylonitrile, acrylic acid, methacrylic acid and methyl or ethyl esters of them, vinyl heterocyclic compounds such as vinylpyridine and vinylcarbazole, and conjugated diene compounds such as butadiene and isoprene; and thermoplastic resin compositions substantially comprising said polymers as main components. Such polymers are well known materials of commerce and need not be described in detail herein. As is shown by the following Examples such materials as high-impact polystyrene and acrylonitrile-butadiene-styrene resins can be employed in the invention. The term "polystyrene resin" employed herein includes all of these well known materials.

In the practice of the invention, the amounts of (1) TCP and/or TPP and (2) TBA, in the complex flame-retarding agent should be determined so as to achieve a favorable balance of the desired flame-retarding effect in relation to the lowering of the physical properties of resin composition caused by their incorporation in the resin. Generally, the presence of at least 2% by weight composed of equimolar amounts of (1) TCP and/or TPP and (2) TBA in the final product is necessary. Although the use of said two components (1) and (2) in an equimolar mixture exhibits the most efficient flame-retarding effect, the synergistic effect can be obtained by using them in a molar ratio of (TCP and/or TPP):TBA = 8:2 – 1:9, preferably, 6:4 – 2:8. In the latter case wherein the ratio of the components in the mixture is different from the equimolar ratio of 5:5, the sum of weights of (a) the component present in minor amount and (b) the equimolar amount of the other component (i.e. the weight of the equimolar mixture) should be at least 2% by weight based on the entire polystyrene resin composition. In other words, the polystyrene resin composition must contain at least 2 percent by weight of a mixture of equimolar amounts of (1) TCP and/or TPP and (2) TBA. The polystyrene resin composition can contain a larger amount of (1) or (2), i.e. more than is necessary to make said equimolar mixture. For example, if a mixture of TPP:TBA = 6:4 (molar ratio) is used, the amount of the mixture required is about 2.38% by weight made up of 2 wt. % of equimolar mixture of TPP and TBA and the balance is extra TPP. The ratio depends on the particular type of polystyrene resin employed. Generally, imparting a flame-retarding property to polyolefins and vinyl polymers is more difficult as compared with cellulose, polyesters and polyurethanes which burn to form carbides. Inter alia, the imparting of flame-retarding property to polymers containing diene elastomers such as HI (high impact) polystyrene and ABS (acrylonitrile-butadiene-styrene) resins in particularly difficult. In many cases, they are generally imparted with a flame-retardant property by blending same together with polyvinyl chloride, chlorinated polyethylene, polycarbonates, etc. As for the ratio of (1) TCP and/or TPP to (2) TBA, in a polystyrene resin containing a diene elastomer, according to the invention, it is preferred to use an increased amount of TBA from the viewpoint of imparting thereto a sufficient flame-retardant property.

Although there is no particular upper limit on the amount of the flame-retarding agent consisting of a mixture of (1) TCP and/or TPP and (2) TBA from the viewpoint of imparting the flame-retardant property, there is an upper limit of 25% by weight from the viewpoint of the physical properties of polystyrene resin. Generally, the purpose of the invention can be attained by employing less than 20% by weight of said flame-retarding agent. There are various modes of incorporating the flame-retarding agent in polystyrene resin. The incorporation may be effected easily by emloying generally used homogenizing and blending means such as hot rolls, Banbury mixers and extruders, because said compounds are well compatible with polystyrene resin. In another method, TCP and/or TPP is added to and thereby dissolved in the monomer prior to or during the polymerization of the polystyrene resin and, after completion of the polymerization, the polymer is mechanically mixed with TBA by the above described means. By this method, the mixing of TCP and/or TPP with the resin composition is effected molecularly, whereby the effect of imparting the flame-retardant property is improved further. However, the incorporation of TBA during the polymerization is undesirable, because it gives many bad effects such as reduction of the polymerization velocity and reduction of the molecular weight.

Conventional additives such as plasticizers, lubricants, agents for preventing thermal deterioration and ultraviolet ray absorbing agents can be used in the resin composition without detrimental effects, because TCP, TPP and TBA are all chemically stable compounds. The flame-retarding agent comprising a mixture of (1) TCP and/or TPP and (2) TBA, used in the invention has an excellent effect. The final product containing said agent has an unexpectedly high flame-retardant property which has hitherto been unattainable without significant damage of the other intrinsic properties of polystyrene resin. According to this invention, there can be prepared various molded products possessing a flame-retarding property capable of meeting severe requirements. Thus, it is expected that the composition of the invention can be employed in fields in which polystyrene resins have hitherto not been used.

The excellent efficiency of the complex flame-retarding agents of the invention will be made clear by reference to the following comparison examples and examples, which by no means limit the invention.

The term "parts" in the following comparison examples and examples refer to parts by weight per 100 parts of resin composition.

COMPARISON EXAMPLE 1

Pellets of commercial ABS resin (Cevian V-100; a product of Daicel Ltd.; moderate grade of impact resistance, Rubber Content : 9.1 wt.%; Weight ratio of acrylonitrile: styrene = 27 : 73) were blended with TPP alone, TBA alone or a mixture of TPP:TBA = 1.2 (molar ratio) in a 10 liter V-blender for about 15 minutes to obtain a homogeneous blend. Then, the thus obtained blend was shaped into pellets by using a 40 mm. diameter extruder. The pellets were then shaped into test pieces of a predetermined size by using a molding machine of 4 oz. capacity. Tests on the flame-retarding property were effected according to the specifications of ASTM-635 and UL-94. The results are shown in Table 1. The results of the tests on flame-retarding property according to ASTM-635 are shown graphically in FIG. 1.

Figure 1:
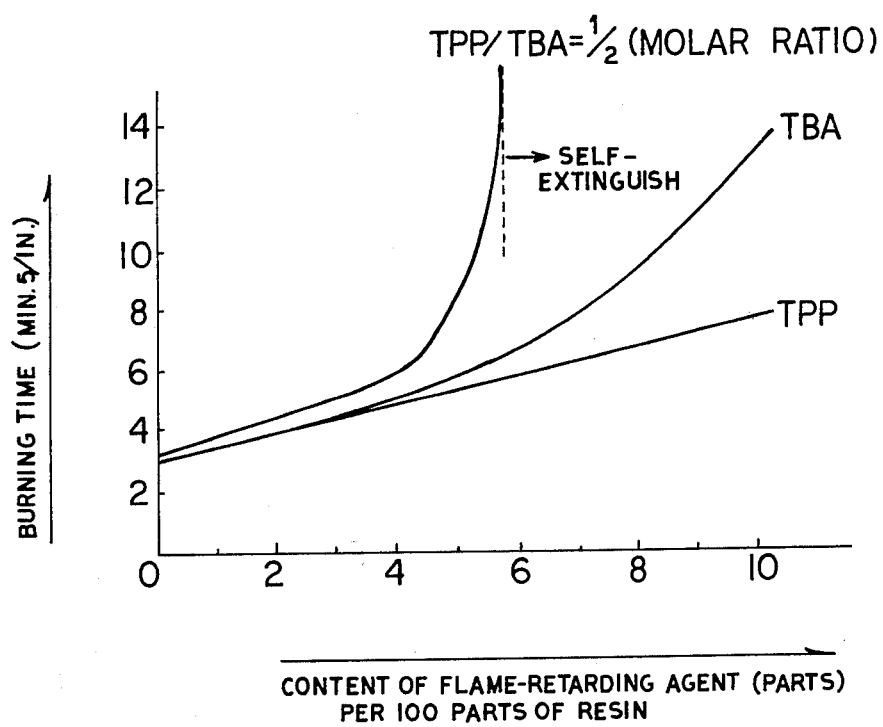
FIG. 1 is a graph of burning time versus the amount of flame-retarding agent for the tests described in Comparison Example 1.

In the graph in FIG. 1, the relationship between the burning time (min./5 in.) and content of flame-retarding agent is plotted in the cases of using TPP alone, TBA alone and TPP/TBA = ½ to show the differences between them.

It is apparent from FIG. 1 and Table 1 that a flame-retardant property superior to that obtainable by using TPP alone or TBA alone can be obtained by using combinations of TPP and TBA.

COMPARISON EXAMPLE 2

Figure 2:
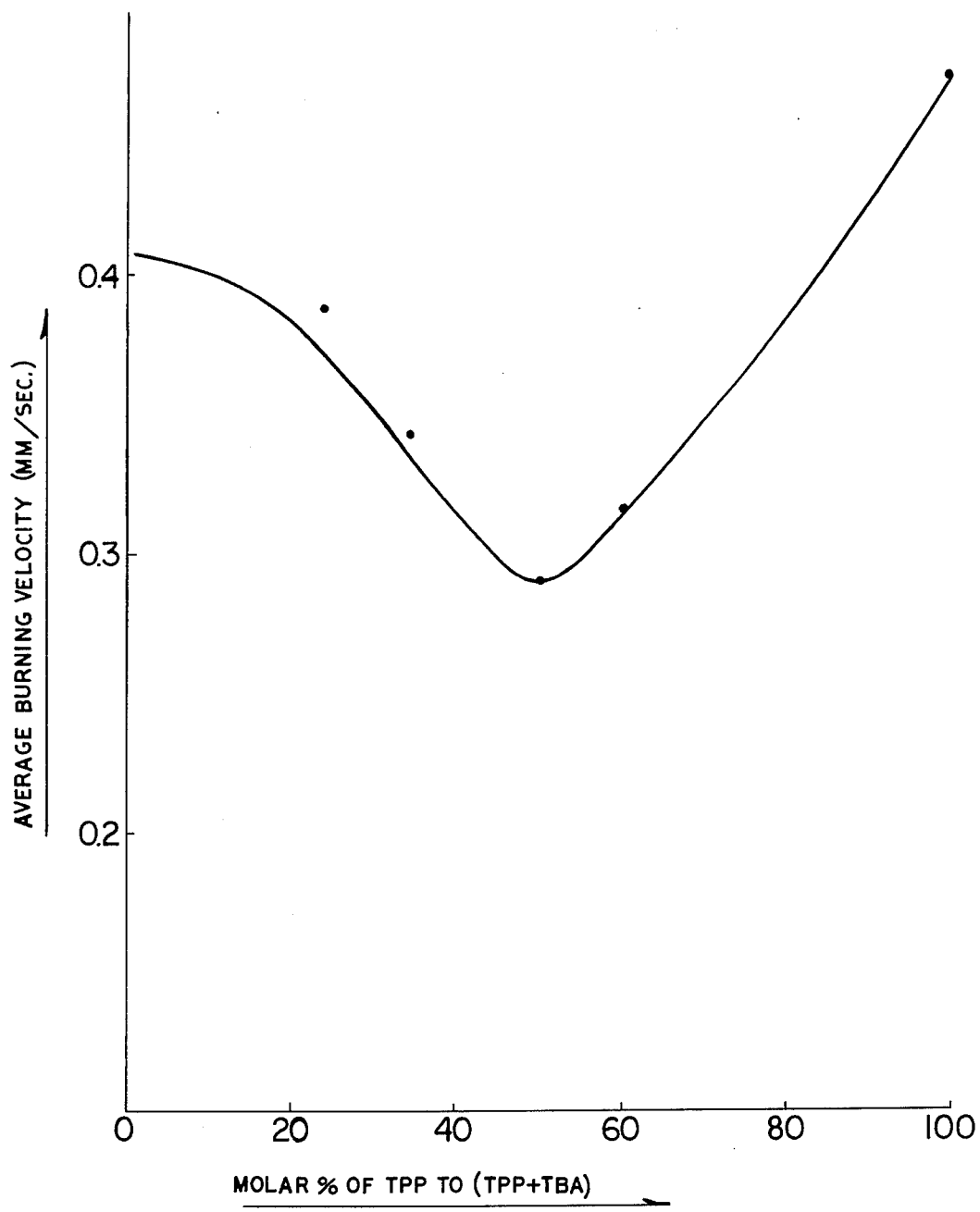
FIG. 2 is a graph of average burning velocity versus the molar percentage of TPP based on the sum of TPP + TBA for the tests described in Comparison Example 2.

The total quantity of flame-retarding agent was fixed to be 6 parts per 100 parts of the resin. The burning velocities at various blend ratios of TPP and TBA were measured by using five test pieces according to the specification of ASTM-635 in the same manner as in Comparison Example 1. The results obtained are shown in Table 2. FIG. 2 is a graph showing the relationship between the molar ratio of TPP to TPP plug TBA and average burning velocity.

The burning velocity is the quotient obtained by dividing the length the flame travels by the time required for extinguishing the flame. The average burning velocity is the average of the burning velocities of five test pieces.

Table 1

| TPP content (part) | TBA content (part) | Burning test according to UL-94 Average extinction time | Remarks |
|---|---|---|---|
| 1 | 0 | Not extinguished | |
| 3 | 0 | '' | |
| 5 | 0 | '' | |
| 7 | 0 | '' | |
| 0 | 1 | '' | |
| 0 | 3 | '' | |
| 0 | 5 | '' | |
| 0 | 7 | '' | |
| 1 | 1 | '' | |
| 2 | 2 | 90 seconds | |
| 3 | 3 | 52 seconds | |
| 2 | 4 | 36 seconds | |
| 3 | 6 | 14 seconds | SE-II property |
| 4 | 8 | 3 seconds | '' |

Table 2

| Molar % of TPP | Molar % of TPP to the sum of TPP and TBA and burning velocity Test piece No. | | | | | Average burning velocity (mm/sec.) |
| | 1 | 2 | 3 | 4 | 5 | |
|---|---|---|---|---|---|---|
| 100 | 270/127 (0.471) | 285/127 (0.446) | 264/127 (0.482) | 291/127 (0.436) | 272/127 (0.468) | 0.461 |
| 60 | 409/127 (0.312) | 401/127 (0.317) | 408/127 (0.311) | 397/127 (0.320) | 390/127 (0.326) | 0.317 |
| 50 | 206/52 (0.253) | 259/64 (0.246) | 193/57 (0.245) | 150/50 (0.366) | 210/60 (0.286) | 0.289 |
| 35 | 244/92 (0.377) | 184/57 (0.309) | 120/37 (0.308) | 163/51 (0.312) | 242/98 (0.406) | 0.342 |
| 25 | 170/52 (0.306) | 90/32 (0.356) | 110/52 (0.471) | 101/40 (0.345) | 131/54 (0.412) | 0.388 |
| 0 | 327/127 (0.389) | 304/127 (0.491) | 301/127 (0.422) | 320/127 (0.397) | 307/127 (0.415) | 0.408 |

EXAMPLE 1

100 Parts of a commercial polystyrene (trade name: Estyrene G–20, a product of Shin-Nihon Seitetsu Kagaku K.K., standard grade; Melt Index measured by ASTM D–1238: 11g./10 min.) were mixed with 2 parts of TPP and 4 parts of TBA in a 10 liter blender of the V-type. The mixture was extruded and shaped into test pieces in the same manner as in the Comparison Examples. The test pieces self-extinguished in 12 seconds on the average, in the standard test according to UL–94.

EXAMPLE 2

Test pieces obtained from 100 parts of a commercial HI polystyrene (trade name: Estyrene H–40, a product of Shin-Nihon Seitetsu Kagaku K.K.; moderate grade of impact resistance; rubber content: 10 wt.%), 3 parts of TPP and 8 parts of TBA were prepared and tested in the same manner as in Example 1. The test pieces self-extinguished in the test in 2.7 seconds on the average.

EXAMPLE 3

Test pieces obtained from 100 parts of a commercial acrylonitrile-styrene resin (trade name: Cevian N 010, a product of Daicel Ltd.; general grade; copolymer of 27 wt.% acrylonitrile and 73 wt.% styrene having Melt Index by ASTM–1238 of 4.8 g./10 min.), 4 parts of TPP and 6 parts of TBA were prepared and tested in the same manner as in Example 1. The test pieces self-extinguished in 0.8 seconds on the average.

EXAMPLE 4

4 Parts, based on the total amount of monomers, of TPP were dissolved completely in 70 parts of styrene. The resulting solution was mixed thoroughly with 30 parts of acrylonitrile, 0.25 part of lauroyl peroxide as cataalyst and 0.3 part catalyst 5-dodecylmercaptan as molecular weight regulating agent. The thus obtained homogenous mixture was suspended by mechanical stirring in an aqueous medium obtained by dispersing 2 parts of calcium tertiary phosphate in water in a quality corresponding to the total amount of the monomers. After keeping the resulting suspension at 70°C for 7 hours, the temperature of the suspension was gradually elevated up to 85°C for over 4 hours to complete the polymerization. Thereafter, calcium tertiary phosphate was decomposed with hydrochloric acid. After washing with water, dehydration and drying, pearly polymer (copolymer of 27 wt.% acrylonitrile and 73 wt.% styrene) was obtained. It was confirmed by gas chromatography that the TPP content of the polymer was 3.8 % by weight. 100 Parts of the resin and 6 parts of TBA were mixed and test pieces were prepared and tested in the same manner as in Example 1. The test pieces self-extinguished in 0.3 second on the average.

EXAMPLE 5

Test pieces obtained from 100 parts of a commercial acrylonitrile-butadiene-styrene resin (trade name: Cevian V–110, a product of Daicel Ltd.; moderate grade of impact resistance: Rubber Content: 5.4 Wt.%; weight ratio of acrylonitrile : styrene = 27 : 73), 5 parts of TPP and 10 parts of TBA were prepared and tested in the same manner as in Example 1. The test pieces self-extinguished in 2.7 seconds on the average.

EXAMPLE 6

Test were effected in the same manner as in Example 3 except that 4 parts of TCP were used in place of 4 parts of TPP. The test pieces self-extinguished in 3.2 seconds on the average.

EXAMPLE 7

Tests were effected in the same manner as in Example 4 except that 4 parts of TCP were used in place of 4 parts of TPP. The test pieces self-extinguished in 2.7 seconds on the average.

Thus, it is apparent that an excellent self-extinguishing property is exhibited by using the combination of TCP or TPP with TBA according to the present invention.

The embodiments of the invention in which an exclusive property or privilege is claimed are defined as follows:

1. A self-extinguishing resin composition consisting essentially of
    A. polystyrene resin, and
    B. flame retarding agent in an amount of at least 2% by weight and sufficient to impart a self-extinguishing property to the resin composition, said flame retarding agent consisting essentially of a substantially equimolar mixture of
       1. a material selected from the group consisting of tricresyl phosphate, triphenyl phosphate and mixtures thereof, and
       2. tetrabromobisphenol A.

2. A self-extinguishing resin composition according to claim 1, in which the total amount of flame-retarding agent does not exceed 25 percent by weight, based on the total weight of the resin composition.

3. A self-extinguishing resin composition according to claim 1, in which the total amount of flame-retarding agent does not exceed 20 percent by weight, based on the total weight of the resin composition.

4. A self-extinguishing resin composition according to claim 1, in which the flame-retarding agent is blended in the polystyrene resin.

5. A self-extinguishing resin composition according to claim 1, in which the ingredient (1) is added during polymerization of the polystyrene resin and ingredient (2) is blended in the resin after polymerization is completed.

* * * * *